United States Patent [19]

Shaw et al.

[11] Patent Number: 5,737,179
[45] Date of Patent: Apr. 7, 1998

[54] METALLIZED FILM CAPACITOR

[75] Inventors: David G. Shaw, Tucson, Ariz.; Paul Le Gonidec, Douarnenez, France

[73] Assignee: Catalina Coatings, Inc., Tucson, Ariz.

[21] Appl. No.: 598,049

[22] Filed: Feb. 7, 1996

[51] Int. Cl.[6] .............................. H01G 4/32; H01G 4/30; H01G 4/22; H01G 4/005
[52] U.S. Cl. ........................... 361/301.5; 361/301.4; 361/303; 361/312; 361/313; 361/314; 361/317; 361/319; 361/323
[58] Field of Search ................ 361/301.5, 303–305, 361/311–317, 309, 323, 301.4, 319, 511, 530; 29/25–42

[56] References Cited

U.S. PATENT DOCUMENTS

| | | | |
|---|---|---|---|
| 4,012,817 | 3/1977 | Preissinger et al. | 29/25.42 |
| 4,499,520 | 2/1985 | Cichanowski | 361/311 |
| 4,513,349 | 4/1985 | Olson et al. | 361/311 |
| 4,515,931 | 5/1985 | Olson et al. | 526/323.2 |
| 4,555,746 | 11/1985 | Mochizuki et al. | 361/323 |
| 5,440,446 | 8/1995 | Shaw et al. | 361/301.5 |
| 5,614,111 | 3/1997 | Lavene | 219/121.59 |
| 5,615,078 | 3/1997 | Hudis et al. | 361/313 |

FOREIGN PATENT DOCUMENTS

WO9510117   4/1995   WIPO.

OTHER PUBLICATIONS

Modified Abstract, Publication No. 97300718.0, p. 1 (No Date Provided).

*Primary Examiner*—Bot L. Ledynh
*Attorney, Agent, or Firm*—Christie, Parker & Hale, LLP

[57] ABSTRACT

Sheet capacitive materials for use in forming a thin-film capacitor comprise an electrically nonconductive substrate, a layer of electrically conductive material disposed a surface of the substrate, and a layer of electrically nonconductive material disposed onto a surface of the conductive material layer. The conductive material layer includes a contact area along a first lengthwise edge of the substrate that is thicker than remaining portions of the material layer. A portion of the substrate adjacent a second lengthwise edge remains exposed. The electrically nonconductive material includes an anti-stick component, and covers the exposed substrate surface and a major portion of the material layer except for the contact area. A first and second sheet is constructed having contact areas along opposite lengthwise edges. The sheets are placed together so that the contact areas are oriented at opposite lengthwise edges, and are staggered so that the contact areas remain exposed. The sheets are wound together in a spiral to form a roll having a contact area at each respective end. Metal is sprayed onto the exposed contact areas to form capacitor electrodes. A thin-film capacitor formed from such sheet capacitive materials have improved properties of corrosion resistance and self healing when compared to conventionally constructed thin-film capacitors.

14 Claims, 3 Drawing Sheets

METALLIZED FILM CAPACITOR

FIELD OF THE INVENTION

This invention relates to metallized film capacitors and, more particularly to metallized film capacitors formed from sheet capacitive materials having antistick characteristics.

BACKGROUND OF THE INVENTION

Electrical capacitors are used for storing energy in a variety of applications. Operating voltages for such devices range from a few volts, such as those used in miniature electronic circuits, to thousands of volts, such as those used in power utility applications.

Very broadly, a capacitor has a pair of conductive "plates" or electrodes separated by a dielectric material. The conducting electrodes are typically composed of copper, silver, aluminum foil, or vacuum deposited zinc or aluminum. Capacitors utilize a variety of dielectrics ranging from ceramic materials, metal oxides, particularly tantalum oxide, plastic sheets or films, and paper.

For low and medium voltages (generally below 600 volts) metallized sheet dielectrics are commonly used. Capacitors formed from such metallized sheet dielectrics can be formed from a pair of metallized sheet dielectrics that are wound together into a roll. Specifically, such capacitors can are formed from depositing a thin layer of conductive materials onto a pair of polymer films to each form a metallized sheet, and winding the pair of metallized sheets together into a roll.

Higher voltage capacitors are generally constructed of aluminum foil electrodes and sheet dielectric material such as a thermoplastic polypropylene and polyester film. Capacitors intended for service at more than about 600 volts are completely impregnated with a dielectric liquid with good gas absorbing properties. Typical dielectric liquids with good gas absorbing properties are PXE (phenyl xylyl ethane), MIPB (mono isopropyl biphenyl), DOP (dioctyl phthalate), castor oil, polypropylene glycol and mineral oil.

Capacitors constructed in this manner are known to suffer from atmospheric corrosion, due to both the thin layer thickness of the metallized layer and the reactivity of the selected conductive material. To minimize metallized sheet corrosion, it is known to deposit a thin film of electrically nonconductive material onto the metallized sheet surface. However, capacitors constructed comprising such electrically nonconductive material display a poor ability to self heal from corona discharge of the metallized sheet. During discharge of the capacitor, oftentimes the metallized sheet undergoes corona discharge which causes a portion of the metallized sheet to be blown away or released from the polymer film. The electrical nonconductive material forms a sticky layer adjacent the metallized layer that interferes with self healing because it retains the blown away metallized layer and prevents it from returning to the metallized layer. Accordingly, the discharge capacity, and thus the service life, of such capacitor is constantly being reduced during use.

It is, therefore, desirable that a metallized thin-film capacitor be constructed having metallized layers that are resistant to atmospheric corrosion, and having improved self healing properties from the effects of corona discharge. It is desired that the metallized film capacitor be constructed for used in both a dry and an nonimpreganated form without a great loss in its performance.

SUMMARY OF THE INVENTION

Sheet capacitive material constructed according to principles of this invention, for use in constructing metallized thin-film capacitors, comprise an electrically nonconductive substrate in the form of a strip. A layer of electrically conductive material is disposed on major portion of the substrate, extending from a first lengthwise substrate edge to a position near a second substrate lengthwise edge, so that a portion of the substrate surface adjacent the second lengthwise edge remains exposed. The conductive material layer is thicker along the first lengthwise edge than the remaining portion of the conductive material layer, forming a contact area. The formation of a relatively thicker contact area helps to prevent capacitor failure due to corrosion.

A layer of electrically nonconductive material is disposed onto a major portion of a surface of the conductive material layer, and onto the exposed surface of the substrate. The electrically nonconductive material is not disposed on the contact area. The electrically nonconductive material includes an anti-stick component that prevents the electrically nonconductive material from sticking to an adjacent surface when the sheet of capacitive material is wound in a spiral to form a capacitor.

A first sheet of capacitive material and a second sheet of capacitive material are each constructed in the manner disclosed, with the contact area for each sheet disposed on opposite lengthwise substrate edges. The first and second sheets are laid on one another such that the contact areas of each sheet are at opposite lengthwise edges and are facing toward the same direction. The first and second sheets are staggered to that the contact areas of each sheet are exposed and not covered up. The first and second sheets are wound together in a spiral to form a roll having a contact area extending from each roll end. The contact areas at each roll end are sprayed with molten metal to form the electrodes for the thin-film capacitor.

A thin-film capacitor formed from sheet capacitive materials of this invention has improved properties of corrosion resistance and improved self healing, when compared with other known thin-film capacitor constructions.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

This invention relates to metallized thin-film capacitors constructed in roll form from one or more windings of sheet capacitor material, wherein each sheet comprises a dielectric film substrate, an electrically conductive material disposed on a surface of the film, and an electrically nonconductive material disposed on a portion of a surface of the electrically conductive layer.

Figure 1:
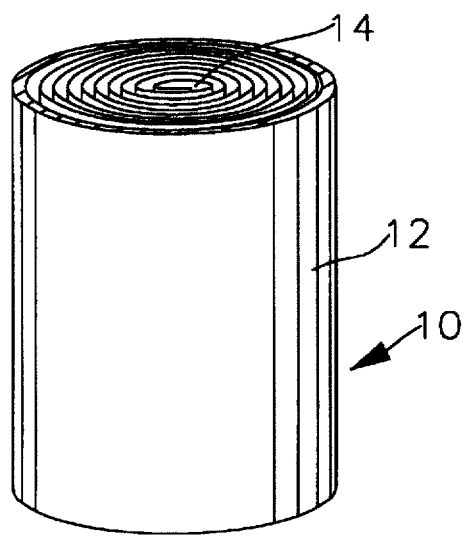
FIG. 1 illustrates schematically a metallized sheet capacitor comprising sheet conductive materials constructed according to principles of this invention.

Referring to FIG. 1, a capacitor 10 constructed according to principles of this invention has a generally cylindrical shape in the form of a can 12, tapped winding and the like. An end of the can 12 is cut away to show one or more rolls of sheet capacitor material 14 inside the can. Each sheet 14 is wound into a cylindrical roll and comprises alternating layers of dielectric film, electrically conductive material, and electrically nonconductive material coiled in a tight spiral. The layers of conductive material form the electrodes of the capacitor, and the dielectric film and layers of nonconductive material between the electrodes permits accumulation of charge in the capacitor. Optionally, such a capacitor, intended for use at higher voltages, may be filled with a dielectric liquid such as those mentioned above. Suitable dielectric liquids include phenyl xylene ethane (PXE), mono isopropyl biphenyl (MIPB), idoctyl phthalate (DOP), caster oil, polypropylene glycol, and mineral oil.

Figure 2:
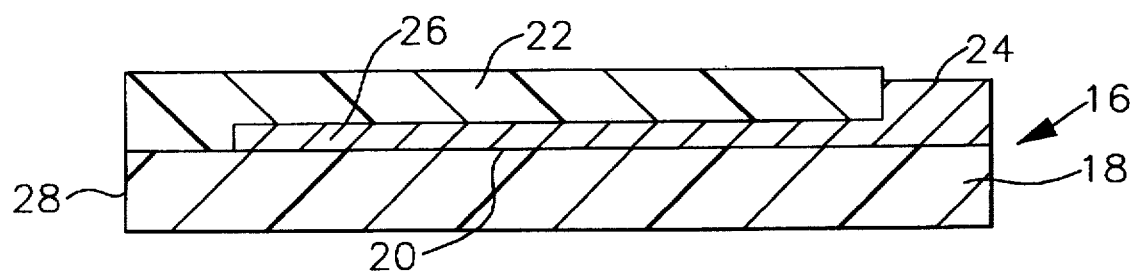
FIG. 2 is a cross-sectional view of a sheet capacitive material, constructed according to principles of this invention, suitable for winding the capacitor.

Referring to FIG. 2, a transverse cross section of a single sheet capacitive material 16 used for winding the capacitor is illustrated. It will be recognized that in the drawings, the sheet capacitive material, and the various layers of material that is used to form the same, are drawn schematically and at a scale suitable for illustration rather than at the scale of the actual material. A sheet capacitive material 16 suitable for winding a capacitor each includes a dielectric thermoplastic substrate 18, a layer of electrically conductive material 20 disposed on a surface of the substrate, and a layer of electrically nonconductive material 22 disposed on a major portion of a surface of the electrically conductive material 20.

Referring to the substrate 18, it is desired that the substrate be formed from a thin sheet of electrically nonconductive material, such as polypropylene or polyester, having a stable dielectric constant and high dielectric strength. Suitable substrates also include copolymers of such materials and coextruded sheets. In a preferred embodiment, the substrate is formed from thin films of polypropylene or polyester and the like, having a thickness in the range of from about 4 to 12 micrometers.

Referring to the electrically conductive material 20, it is desired that the material be selected from the group consisting of metals and metal alloys. Preferred electrically conductive materials are aluminum, zinc and alloys of the two. The electrically conductive materials selected are preferably those that can be applied to the surface of the substrate by vacuum deposition or sputtering technique. It is desired that the thickness of the conductive material layer be in the range of from about 100 to 1,000 Å. The conductive material layer is disposed on a major portion of an underlying substrate surface, for each sheet capacitive material, having a relatively thicker cross section along one lengthwise edge of the sheet than that along the remaining substrate surface. For purposes of reference, the relatively thicker section of the conductive material 20 is referred to as an electrode contact area 24, and the relatively thinner section of the conductive material that extends widthwise across the sheet from the contact area 24 to the opposite lengthwise edge is referred to as an active area 26.

It is desired that the contact area 24 of the conductive material layer 20 be at least 30 percent thicker than the active area 26, and preferably twice as thick. In a preferred embodiment, the thickness of the conductive material layer 20, when formed from aluminum or zinc, is in the range of from 150 to 500 Å at the active area 26, and is in the range of from about 300 to 1,000 Å at the contact area 24. The desired thickness of the active area is governed by economics and manufacturing time on the high side, and is governed by the desired amount of resistance on the low side. An active area having a thickness less than about 150 Å will have a resistance that is lower than that desired. An active area having a thickness greater than about 500 Å will not display a desired degree of self healing from corona discharge, ultimately reducing the service life of a thin-film capacitor so formed.

The desired thickness of the contact area is governed by economics and manufacturing time on the high side of the range, and is governed by the need to provide a desired degree of corrosion resistance on the low side of the range.

It is desired that the contact area have a resistivity at least 30 percent higher than the active area. For conductive material layers 20 formed from aluminum or zinc, it is preferred that the active area 26 have a flat surface resistivity in the range of from about 2 to 20 ohm/square, and the contact area 24 have a flat surface resistivity in the range of from about 0.5 to 3 ohm/square.

The conductive material layer 20 is disposed onto all but a minor portion of the underlying substrate surface that is located along a lengthwise edge 28, so that the conductive material layer is coterminous with only one lengthwise edge of the sheet capacitive material 16. Each sheet conductive material 16 is constructed with the conductive material layer 20 disposed along only one lengthwise edge of the substrate 18 so that, when rolled into a spiral configuration, each sheet conductive material has only a single electrode located along the lengthwise edge.

With respect to the layer of electrically nonconductive material 22, it is desired that the material be selected from the group consisting of acrylates having anti-stick properties after curing when placed against adjacent surface, e.g., when placed against a backside surface of the substrate when wound together with another sheet capacitive material. Suitable acrylates can be single component acrylates that have an anti-stick component, such as a fluorinated group or other type of component that provides anti-stick properties to the cured acrylate, or can include mixtures of conventional acrylates without anti-stick components with acrylates that have anti-stick components.

It is desired to deposit a thin layer of the acrylate material having an anti-stick component onto the surface of the underlying conductive material layer for purposes of minimizing and/or preventing corrosion of, and improving the scratch resistance of, the underlying thin conductive material layer 20. It is desired that the electrically nonconductive layer 22 have a thickness of less than about one micrometer, preferably in the range of from about 0.05 to 0.2 micrometers, and more preferably of approximately 0.1 micrometer. It is desired that the electrically nonconductive layer be as thin as possible so that it does not have so great an effect on the dissipation factor to cause unwanted heating of the capacitor that would ultimately reduce the service life of the capacitor.

Examples of acrylates useful in forming the electrically nonconductive material layer 22 that do not include an anti-stick component include those disclosed in U.S. Pat. No. 5,440,446, which is hereby incorporated by reference. Examples of acrylates useful in forming the electrically nonconductive material layer 22 that do not include an anti-stick component also include blends of acrylate and non-acrylate materials, such as oils and other non-curable materials. Examples include acrylate resin monomers having a molecular weight in the range of from about 150 to 600. Preferably, the monomers have a molecular weight in the range of from 200 to 400. If the molecular weight is below about 150, the monomer is too volatile and does not condense well for forming a monomer film. Monomer that does not condense on the desired substrate may foul vacuum pumps and hinder operation of an electron gun used for polymerizing the resin. If the molecular weight is more than about 600 the monomer does not evaporate readily in the flash evaporator at temperatures safely below the decomposition temperature of the monomer.

Suitable acrylates not only have a molecular weight in the appropriate range, they also have a "chemistry" that does not hinder adhesion and wetting on the metal layer. Generally, more polar acrylates have better adhesion to metal layers than less polar monomers.

A typical monomer used for flash evaporation includes an appreciable amount of diacrylate and/or triacrylate to promote crosslinking. Blends of acrylates may be employed for obtaining desired evaporation and condensation characteristics and wetting and adhesion to the metal layer, and for controlled shrinkage of the deposited film during polymerization.

Suitable monomers are those that can be flash evaporated in a vacuum chamber at a temperature below the thermal decomposition temperature of the monomer and below a temperature at which polymerization occurs in less than a few seconds at the evaporation temperature. The mean time of monomer in the flash evaporation apparatus is typically less than one second. Thermal decomposition, or polymerization are to be avoided to minimize fouling of the evaporation apparatus. The monomers selected should also be readily capable of crosslinking when exposed to ultraviolet or electron beam radiation.

The monomer composition may comprise a mixture of monoacrylates and diacrylates. Triacrylates tend to be reactive and may polymerize at the evaporation temperatures. Generally speaking, the shrinkage is reduced with higher molecular weight materials.

Generally it is desirable that at least a major portion of the acrylate monomer evaporated is a polyfunctional acrylate for crosslinking. An important feature of the polymerized acrylate coating is that it has good solvent resistance for inhibiting attack by the dielectric liquid in a capacitor. Preferably, the acrylate comprises at least 70 percent polyfunctional acrylates such as diacrylate or triacrylate. If the degree of crosslinking is too low the polymerized acrylate layer may not have adequate solvent resistance or cure speed.

There are situations when less than half of the acrylate monomer comprises polyfunctional acrylates. For example, in a dry capacitor film one composition comprises about 80% monoacrylate and 20% diacrylate. The high proportion of monoacrylate is used since it has a high dielectric constant. The diacrylate cross links to give strength to the layer, however, the layer is not as strong as when higher proportions of polyfunctional acrylate are used.

Preferably, the molecular weight of the acrylate monomer is in the range of from 200 to 400. If the molecular weight is less than about 200, the monomer evaporates readily, but may not condense quantitatively on the substrate without chilling of the substrate. If the molecular weight is more than about 400, the monomers become increasingly difficult to evaporate and higher evaporation temperatures are required. As mentioned above, some fluorinated methacrylates with higher molecular weights are equivalent to lower molecular weight nonfluorinated acrylates.

Preferably, the acrylate monomer has a vapor pressure at 25° C. in the range of from 1 to 20 micrometers of mercury. If the vapor pressure is less than about one micrometer, exceptionally high temperatures may be required to evaporate sufficient material for forming a coating on the sheet substrate at reasonable coating speeds. High temperatures may lead to thermal decomposition or premature curing of the monomers. If the vapor pressure is higher than about twenty micrometers of mercury, condensation of the monomer to form a film on the substrate may have too low an efficiency for practical coating operations. Adequate efficiency may not be obtained until the surface of the substrate is cooled below the freezing point of the monomer, in which case the material may not polymerize properly.

There are at least five monoacrylates, ten diacrylates, ten to fifteen triacrylates and two or three tetraacrylates which may be included in the composition. Most preferably the acrylate comprises hexane diol diacrylate (HDDA) with a molecular weight of 226 and/or tripropylene glycol diacrylate (TRPGDA) with a molecular weight of about 300. Other acrylates may be used, sometimes in combination, such as the monoacrylate 2-phenoxy ethyl acrytate (M.W. 192); the diacrylates diethylene glycol diacrylate (M.W. 214), neopentyl glycol diacrylate (M.W. 212), propoxylated neopentyl glycol diacrylate (M.W. 328) and polyethylene glycol diacrylate, tetraethylene glycol diacrylate (M.W. 302); and triacrylates trimethylol propane triacrylate (M.W. 296), ethoxylated trimethylol propane triacrylate (M.W. 428), propylated trimethylol propane triacrylate (M.W. 470) and pentaerythritol triacrylate (M.W. 298). Monomethacrylates isobornyl methacrylate (M.W. 222) and 2-phenoxyethyl methacrylate (M.W. 206) and dimethacrylates triethylene glycol dimethacrylate (M.W. 286) and 1,6-hexanediol dimethacrylate (M.W. 254) may also be useful, but may cure too slowly to be useful for high speed coating operations.

It is known that adhesion may be enhanced between a sheet and an acrylate coating, by using an acrylate containing high molecular weight components. In practice very high molecular weight oligomers are usually mixed with low molecular weight monomers. The oligomers usually have molecular weights of greater than 1,000 and often as large as 10,000 or even higher. The monomers are used as diluents to lower the coating viscosity and provide an increased number of acrylate groups for enhancing cure speed, hardness and solvent resistance in the resulting coating.

It has generally been considered that it is not feasible to evaporate high molecular weight acrylates because of their very low vapor pressure and high viscosity. Evaporated acrylate coatings have been restricted to low molecular weight monomers, generally below a molecular weight of about 400 and with low viscosity. Generally the viscosities are below 50 centistoke. For example, Henkel 4770, which is an amine acrylate, has a sufficiently high molecular weight that it has a viscosity of about 1000 centistokes at 25° C. This material cures in the evaporator before evaporating. Beta carboxy ethyl acrylate (BCEA) which has a viscosity of over 200 centistokes also cures in the evaporator.

It has been found, however, that by mixing a very low and a very high viscosity material, flash evaporation, condensation and curing can be obtained. For example, a mixture of 70 percent of Henkel 4770 and 30 percent diethylene glycol diacrylate has a viscosity of about 12 centistokes and can be successfully evaporated, condensed and cured. A mixture of 70 percent tripropylene glycol diacrylate (TRPGDA) and 30 percent of beta carboxy ethyl acrylate (BCEA) has a viscosity of about 15 centistokes and can be readily evaporated, condensed and cured. The low viscosity component lowers the viscosity of the blend, which improves atomization in the evaporator and assists in the flash evaporation of the high viscosity acrylate.

There is essentially a trade off between the molecular weights (and hence viscosities) of the high and low molecular weight acrylates. Generally, the lower the molecular weight and viscosity of the low molecular weight component, the higher the molecular weight and viscosity of the higher molecular weight component can be for satisfactory evaporation and condensation. The reason for good atomization in the flash evaporator is straight-forward. This is essentially a physical effect based on the viscosity of the blend. The reason for successful evaporation is not as clear. It is hypothesized that the low molecular weight acrylate essentially dilutes the high molecular weight material and energetic evaporation of the lower molecular weight material effectively sweeps along the higher molecular weight material.

When blends of high and low molecular weight acrylates are used, it is preferred that the weighted average molecular weight of the blend be in the range of from 200 to 600 and preferably up to about 400. This assures that there is good vaporization of the blend at reasonable temperatures in the evaporator.

Some examples of low molecular weight acrylates are hexane diol diacrylate, diethylene glycol diacrylate, propane diacrylate, butane diol diacrylate, tripropylene glycol diacrylate, neopentyl glycol diacrylate, phenoxyethyl acrylate, isobornyl acrylate and lauryl acrylate. Some examples of high molecular weight acrylates are bisphenol A diacrylate, Radcure 7100 (an amine acrylate available from Radcure, Atlanta Ga.), Radcure 169, Radcure 170, Henkel 4770 (an amine acrylate available from Henkel Corporation, Ambler, Pa.) and glycerol propoxy triacrylate. Acid-type acrylates are generally not preferred for capacitor applications because of their impact in raising the dissipation factor.

The above-identified acrylic resins are mixed with an amount of acrylic or other resin or oil comprising an anti-stick component, such as those selected from halogen-containing materials. Desired anti-stick acrylates include fluorinated acrylates such as fluorinated monoacrylates, diacrylates, and methacrylates and the like, having a molecular weight in the range of from about 200 to 2,000. Higher molecular weight fluorinated acrylates can be used because they are more volatile than normal nonfluorinated acrylates and, therefore, do not adversely increase the cure time of the electrically nonconductive layer.

The mixture of acrylates forming the electrically nonconductive material layer 22 may comprise in the range of from about 50 to 98 percent by weight of the conventional or nonanti-stick acrylate with in the range of from about 2 to 50 percent by weight of the acrylate comprising the anti-stick component. In a preferred embodiment, the electrically nonconductive material comprises approximately 90 percent by weight hexane diol diacrylate and approximately 10 percent by weight fluorinated monoacrylate. A particularly preferred fluorinated monoacrylate is one available from, for example, 3M Chemical Co., of Saint Paul, Minn. under the product name FX-189, having a molecular weight of approximately 650.

The use of an acrylate or acrylate mixture having an anti-stick component is desired to prevent the cured acrylate layers from sticking to adjacent surfaces of the sheet capacitive material used to form the wound capacitor, e.g., a backside surface of the substrate. Sticking is known to occur when conventional acrylates are used after the sheet capacitive materials are wound together and heat treated to a curing temperature, e.g., about 100° C. Sticking is the worst at the center of the wounding due to the increased pressure between the sheets at this location. Such sticking is not desired because it adversely affects the ability of the capacitor to self heal after corona discharge when a portion of the conductive material layer is blown away from the substrate. It is believed that acrylate layer sticking impairs self healing because it entraps the blown away conductive material particles and prevents them from returning to the conductive material layer, i.e., to heal.

Use of an acrylate or acrylate mixture comprising an anti-stick component promotes self healing as any conductive material discharged against the electrically nonconductive layer is not trapped therein but, rather is allowed to return to the conductive material layer. The improved self healing of corona induced discharge, that results from use of the nonelectrically conductive layer comprising an anti-stick component, ultimately improves the performance and increases the service life of capacitors that are formed therefrom.

Still referring to FIG. 2, the electrically nonconductive layer 22 is disposed onto a major portion of the underlying conductive material layer 20 surface that extends from the lengthwise edge 28 of the sheet, across the portion of the sheet defining the active area 26, and to the contact area 24, thereby leaving the contact area 24 exposed. The contact area 24 of each sheet 16 is left exposed to facilitate its use as an electrode contact when sheet capacitive materials are wound together in a spiral.

Figure 3:
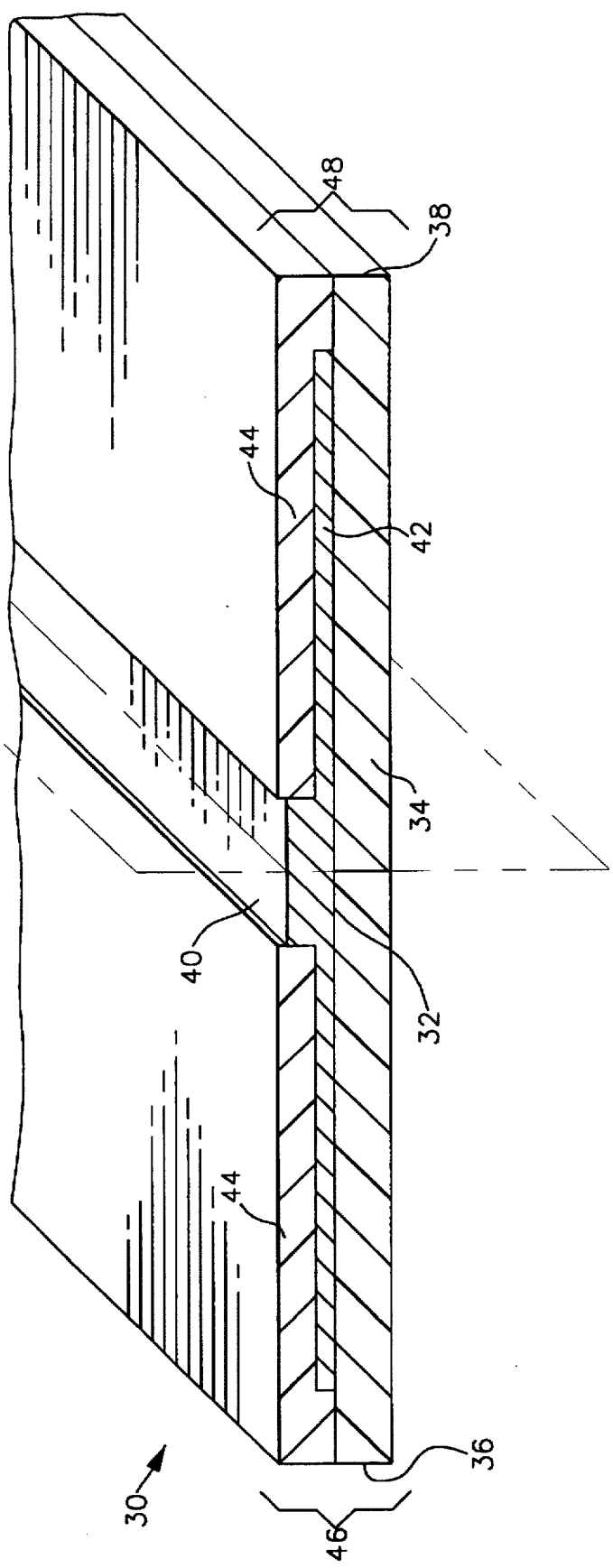
FIG. 3 is a cross-sectional view of sheet capacitive materials constructed according to principles of this invention.

Referring to FIG. 3, sheet capacitive materials 30 constructed according to principles of this invention are constructed by first applying a layer of the conductive material 32 to the surface of the substrate 34. The substrate 34 is in the form of a strip of polymer film. The layer of conductive material 32 is applied to discrete portions of the substrate surface by conventional technique, such as by vacuum metalizing or sputtering. The conductive material layer 32 is disposed along a major portion of the substrate surface except for surface portions adjacent the substrate lengthwise edges 36 and 38. In a preferred embodiment, in the range of from about 2 to 5 millimeters of the substrate surface adjacent each lengthwise edge remains exposed, and preferably approximately 3 millimeters remains exposed.

The conductive material layer 32 includes a contact area 40 that is disposed at the center of the substrate surface. The contact area 40 is thicker than the remaining portion of the conductive material layer 32 that forms the active portion 42. As previously described, a general rule is that the contact area 40 is about twice as thick as the active area 42. A mask is used during the process of applying the conductive material layer to provide the desired thicknesses of both the active and contact areas. In a preferred embodiment, the contact area 40 extends widthwise across the substrate surface in the range of from about 4 to 25 millimeters. A contact area having a width within this range provides the optimum amount of electrode surface area without adversely sacrificing the size of the active area. A contact area having a width greater than about 25 millimeters necessarily reduces the size of the active area, which reduces the capacitance of the capacitor.

The electrically nonconductive layer 44 is applied to a major portion of the underlying conductive material layer 32, except for the contact area 40. The electrically nonconductive layer is applied by conventional application techniques, preferably by evaporation and polymerization technique as described in U.S. Pat. No. 5,440,446, which is herein incorporated by reference. A slotted nozzle is used to avoid applying the electrically nonconductive material layer onto the contact area 40. The nonconductive material layer 44 is applied to cover both the exposed lengthwise edges 36 and 38 of the substrate 34, and all but the contact area 40 of the conductive material layer. In a preferred embodiment, the substrate surface at each lengthwise edge is exposed a width in the range of from about 2 to 5 millimeters, and preferably approximately 3 millimeters. The purpose of the exposed substrate surface is to provide an insulating boundary at an end of the active area so that the active area of the conductive material layer does not extend from a lengthwise edge of the sheet capacitive material.

It is desired that the surface of the nonconductive material layer be coplanar with or be disposed above the plane of the contact area surface to facilitate the subsequent step of rolling the sheet capacitive material into a spiral.

The substrate 34 is slit lengthwise along the middle of the substrate width (as shown in sectioned lines) to form two symmetrically opposite ribbons of sheet capacitive material 46 and 48, each having its own contact area 40 disposed along a lengthwise sheet edge. Although shown in partial section for purposes of reference and illustration, it is understood that the substrate stip can be formed of any length that is desired to facilitate manufacturing and/or to suit the needs of a particular application. Preferably, the substrate strip is in the form of a continuous strip that is passed by different stations arranged serially along the path of the strip to deposit the conductive material layer, and deposit and cure the nonconductive material layer.

Figure 4:
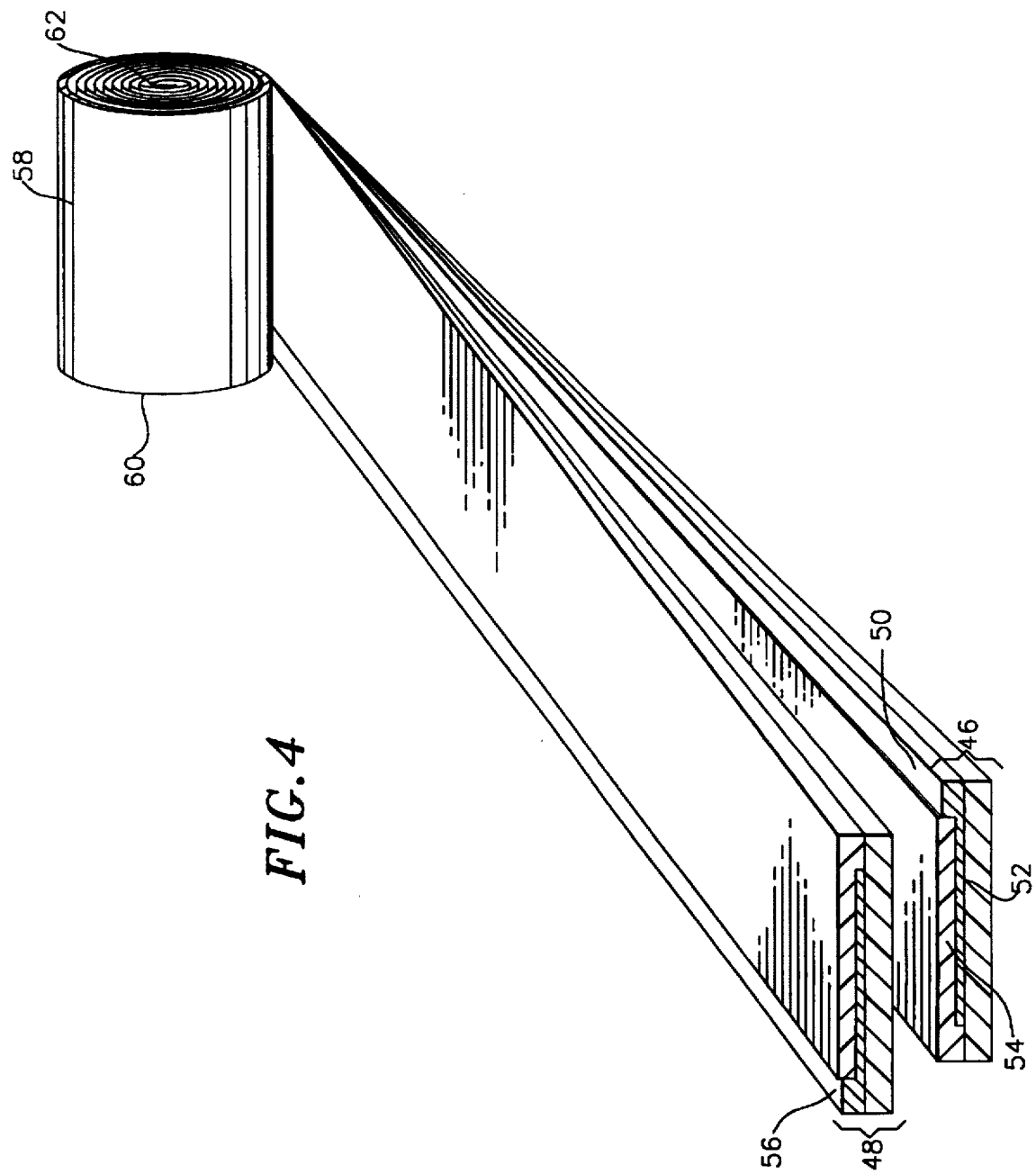
FIG. 4 cross-sectional view of sheet capacitive materials as combined to form a wound metallized thin-film capacitor.

Referring to FIG. 4, the sheet capacitive materials 46 and 48 formed from slitting the substrate strip are combined together to form a metallized thin-film capacitor. Specifically, the first sheet capacitive material 46 is placed with the surface of the contact area 50 of the conductive material layer 52 facing upward along a lengthwise edge of the sheet 46 oriented towards the right side of FIG. 4. The second sheet capacitive material 48 is disposed on top of the surface of the electrically nonconductive material 54 the first sheet capacitive material 46 with the surface of its contact area 56 facing upward along a lengthwise edge of the sheet 48 oriented toward the left side of FIG. 4. The widthwise placement of the second sheet capacitive material 48 on top of the first sheet capacitive material 46 is staggered in the range of from about 2 to 10 millimeters to expose the contact areas of each respective sheet. If the sheets are staggered an amount greater than about 10 millimeters the contact areas could fold over, interfering with the ability to get good penetration of sprayed metal during the step of forming the capacitor electrode. If the sheets are staggered an amount less than about 2 millimeters the limited surface exposure of the contact area would interfere with the ability to make good electrical contact during the spray metal process.

The combined first and second sheet capacitive materials 46 and 48 are wound into a tight spiral in the form of cylindrical roll 58. If desired, for use in high voltage capacitors (above 100 Volts), the roll 58 of sheet capacitive materials can be inserted in a case and filled with an insulating oil to improve its performance. It is to be understood, however, that the thin-film capacitor comprising sheet capacitive materials constructed according to principles of this invention has improved performance when compared to conventionally constructed thin-film capacitors in dry form, or without insulating oils.

The exposed contact area of each respective sheet capacitive material extending from the opposing ends 60 and 62 of the roll form the electrodes of the capacitor. Molten metal is sprayed into each end of the roll to make contact with the respective exposed contact areas 50 and 56 and form a respective electrode (a process called Schooping). Preferred metals for forming the electrode are zinc and lead-tin solder. A connecting lead is either welded or soldered to the relatively thick contact material. The zinc or solder Schooping apparently enters between the metallized plastic sheets and may melt a portion of the sheet to make mechanical and electrical contact to the thin metallized layer on the sheet. During the Schooping process, electrical contact is made only with the contact area of a respective sheet capacitive material, and is not made with an adjacent sheet capacitive material due to the insulating effect of the electrically nonconductive material layer.

Surprisingly, despite the substantially complete enclosure of the metallized layer by acrylate and polypropylene plastic, good electrical contact is made when the electrical contact is sprayed onto the end of the roll. It is believed that a small amount of thermoplastic dielectric sheet melts, thereby assuring good electrical contact with the metallized layer. Polypropylene has a melting temperature of about 165° C., and the cross linked acrylate does not melt. The metallized layer is, in effect, supported by the polymerized acrylate which resists higher temperatures. Good electrical contact was demonstrated by a standard 10 KHz dissipation factor test.

A key feature of thin-film capacitors that are formed from sheet capacitive materials constructed according to principles of this invention is that the use of an electrically nonconductive material layer to cover the active area of the conductive material layer significantly improves the ability of the capacitor to self heal in response to corona discharge. Such improved self healing acts to extend the service life of the capacitor.

Another key feature of thin-film capacitors that are formed from sheet capacitive materials constructed according to principles of this invention is the use of a relatively thicker contact area, which improves the corrosion resistance of both the capacitor electrodes and the active area. The improvement in corrosion resistance also extends capacitor service life.

Many modifications and variations in the constructed of sheet capacitive material for use forming metallized thin-film capacitors will be apparent to those skilled in the art. It is to be understood that the method described above for constructing sheet capacitive material was for purposes of illustration and reference, and that variations of such method for purposes of maximizing manufacturing efficiency are intended to be within the scope of this invention. For example, greater than two sheet capacitive materials can be constructed at once by depositing a number of identical conductive material layers onto the substrate, and depositing an equal number of electrical nonconductive material layers onto the conductive material layer, and slitting the substrate into the desired number of symmetrically opposed sheet capacitive materials.

It will, therefore, be understood that within the scope of the following claims this invention may be practiced otherwise than as specifically described.

What is claimed is:

1. A capacitor comprising:
a first sheet of capacitive material wound into a cylinder, the first sheet comprising:
an electrically nonconductive substrate;
an electrically conductive material disposed on a major portion of a surface of the substrate; and
an electrically nonconductive material disposed on a major portion of a surface of the electrically conductive material, the electrically nonconductive material including an anti-stick component;

a second sheet of capacitive material constructed in the same manner as the first sheet and wound into a cylinder around the first sheet of capacitive material;

wherein the electrically conductive material in each first and second sheet of capacitive material is thicker at one lengthwise edge of a respective sheet than at remaining portions of the same sheet.

2. A capacitor as recited in claim 1 wherein the electrically conductive material of each first and second sheet extends from one lengthwise edge of a respective substrate surface to a position adjacent an opposite lengthwise edge so that electrically nonconductive material is disposed onto the substrate surface.

3. A capacitor as recited in claim 1 wherein the thicker portion of the electrically conductive material layer is about twice as thick as remaining portions of the electrically conductive material layer.

4. A capacitor as recited in claim 1 wherein the electrically nonconductive material of each first and second sheet of capacitive material is disposed on the surface of the electrically conductive material so that a portion of the electrically conductive material adjacent a lengthwise edge of each respective sheet remains exposed.

5. A capacitor as recited in claim 1 wherein the electrically nonconductive material is selected from the group consisting of mixtures of acrylate monomers and acrylate monomers having anti-stick components, and acrylate monomers having anti-stick components.

6. A capacitor as recited in claim 5 wherein the acrylate monomers have a molecular weight in the range of from about 200 to 600 and include at least a major portion of polyfunctional acrylate molecules for crosslinking.

7. A capacitor as recited in claim 6 wherein the anti-stick components are selected from the group consisting of halogen-containing materials.

8. A capacitor as recited in claim 5 wherein the acrylate monomers having anti-stick components have a molecular weight in the range of from 200 to 2,000.

9. A capacitor as recited in claim 5 wherein the electrically nonconductive material is formed from a mixture of acrylate monomers and acrylate monomers having anti-stick components comprising in the range of from about 50 to 98 percent by weight of acrylate monomer, and in the range of from about 2 to 50 percent by weight of the acrylate monomer having the anti-stick component.

10. A wound capacitor comprising:

a first sheet of capacitive material wound into a cylinder comprising:

an electrically nonconductive substrate;

a layer of electrically conductive material disposed on a major portion of a surface of the substrate extending widthwise from a first substrate lengthwise edge to a position adjacent a second substrate lengthwise edge so that a portion of the substrate adjacent the second lengthwise edge remains exposed, wherein the layer of electrically conductive material covering the first lengthwise edge is thicker than remaining portions of the layer and forms a contact area; and a layer of electrically nonconductive material disposed on a surface of the electrically conductive except for the contact area; and a second sheet of capacitive material wound around the first sheet of capacitive material, the second sheet of capacitive material being constructed in the same manner as the first sheet of capacitive material, wherein the contact area of each first and second sheet is positioned at an opposite lengthwise edge of each respective sheet.

11. A wound capacitor as recited in claim 10 wherein the electrically nonconductive material comprises a polymerized acrylate having an anti-stick component.

12. A wound capacitor as recited in claim 11 wherein the material forming the electrically nonconductive layer is selected from the group consisting of mixtures of acrylate monomer and acrylate monomer having anti-stick components, and acrylate monomers having anti-stick components.

13. A wound capacitor as recited in claim 12 wherein the anti-stick component is selected from the group consisting of halogen-containing materials.

14. A wound capacitor as recited in claim 11 wherein the acrylate monomer has a molecular weight in the range of from about 200 to 600, and wherein the acrylate monomer having anti-stick components has a molecular weight in the range of from about 200 to 2,000.

* * * * *